US012619358B1

(12) United States Patent
Raz et al.

(10) Patent No.: US 12,619,358 B1
(45) Date of Patent: May 5, 2026

(54) SYSTEM AND METHOD FOR MEMORY ACCESS DISTRIBUTION

(71) Applicant: Next Silicon Ltd, Givatayim (IL)

(72) Inventors: Elad Raz, Ramat Gan (IL); Ilan Tayari, Tzur Hadassa (IL); Dan Shechter, Tel Aviv (IL); Yoav Lossin, Givat Ada (IL); Ronen Gal, Ramat Gan (IL); Daniel Greenspan, Jerusalem (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/237,066

(22) Filed: Jun. 13, 2025

(51) Int. Cl.
*G06F 3/06* (2006.01)
(52) U.S. Cl.
CPC .......... *G06F 3/0611* (2013.01); *G06F 3/0659* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 11,635,919 | B1* | 4/2023 | Pohlack | G06F 3/0613 |
| | | | | 711/154 |
| 11,720,491 | B2 | 8/2023 | Shechter et al. | |
| 2011/0087858 | A1* | 4/2011 | Persson | G06F 12/1027 |
| | | | | 711/216 |
| 2014/0281353 | A1* | 9/2014 | Bybell | G06F 12/1009 |
| | | | | 711/206 |
| 2016/0350261 | A1* | 12/2016 | Tsirkin | G06F 15/17331 |
| 2017/0315912 | A1* | 11/2017 | Wright | G06F 12/0623 |
| 2018/0210842 | A1* | 7/2018 | Nuzman | G06F 12/1036 |
| 2018/0329832 | A1* | 11/2018 | Takaku | G06F 9/3001 |
| 2020/0192585 | A1* | 6/2020 | Parker | G06F 12/1458 |
| 2022/0224605 | A1* | 7/2022 | Jain | G06F 12/1081 |
| 2022/0283946 | A1* | 9/2022 | Ng | G06F 12/0238 |

* cited by examiner

*Primary Examiner* — Jared I Rutz
*Assistant Examiner* — Alexander J Yoon

(57) ABSTRACT

A system for accessing memory, comprising: transformation circuitry configured to: receive a memory access request; access a transformation mode value associated with the memory access request and indicative of an address transformation function; apply the address transformation function, indicated by the transformation mode value, to a memory address of the memory access request to compute a transformed memory address; and generate a new memory access request using the memory access request and the transformed memory address; and at least one memory area configured to serve the new memory access request according to the transformed memory address.

21 Claims, 9 Drawing Sheets

100

300

Figure 4:
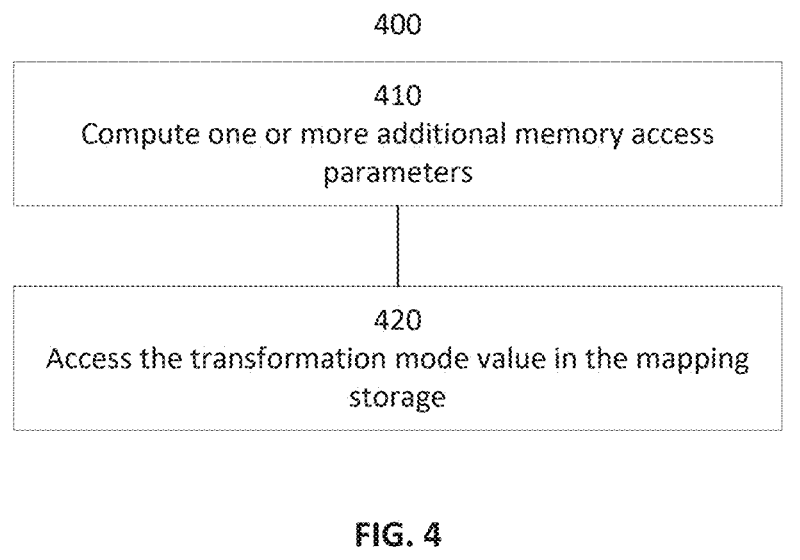

400

| 410<br>Compute one or more additional memory access<br>parameters |

| 420<br>Access the transformation mode value in the mapping<br>storage |

| 510 |
| Determine a linear page address |

| 520 |
| Apply a pattern specific transformation |

620
Generate one or more transformation functions

622
Associate each transformation function with a transformation mode value

623
Compute one or more mappings

630
Configure the one or more transformation functions

632
Configure the one or more mappings

640
Collect a plurality of statistical values

645
Analyze the plurality of statistical values

700

Memory Area 140A

Memory Area 140B

Memory Area 140C

Memory Area 140D

Legend

Page 1 – one area

Page 2 – 2X1

Page 3 – 1X2

Page 4 – 2X2

700

Memory Area 140A

Memory Area 140B

Memory Area 140C

Memory Area 140D

Legend

Page 1 – one area

Page 2 – 2X1

Page 3 – 1X2

Page 4 – 2X2

Page 5 – 2X2

Page 6 – one area

900

SYSTEM AND METHOD FOR MEMORY ACCESS DISTRIBUTION

BACKGROUND

Some embodiments described in the present disclosure relate to memory architecture in computing systems and, more specifically, but not exclusively, to dynamically distributing memory access operations across multiple physical memory areas.

In modem computing systems, the performance gap between the system's memory sub-system and the system's compute units that generate and process memory operations continues to grow. This gap presents a significant challenge to system performance as memory access can become a bottleneck for overall system operation. To combat this performance disparity, computing systems typically employ multiple independent physical memory entities such as cache elements (cache-bins), High Bandwidth Memory (HBM) channels, memory controllers, and multiple HBM memory stacks with their internal subdivisions into bankgroups and banks.

As used herein, the term "memory area" refers to any physical memory region to which application memory is mapped and can service a memory operation. A memory area may be stored in full or in part in a memory storage entity, for example a cache, a cache bin, a scratchpad and a random access memory bank, for example a HBM bank, a dynamic random-access memory (DRAM) and a synchronous dynamic random-access memory (SDRAM). A scratchpad may be a static random access memory (SRAM). A memory area may be accessed via one or more memory access entities that control access to the memory area, for example a HBM controller, a cache controller, a double data rate (DDR) controller and a DRAM controller providing access to a memory component. Some examples of memory areas include L1 cache associated with a specific processing core, shared L2 or L3 cache distributed across multiple processing cores, HBM memory banks within a memory stack, random access memory (RAM) components, and DRAM controllers providing access to off-chip memory.

Distributing memory accesses across multiple physical memory areas is critical for modem high-performance computing systems for several reasons. First, it improves the total available memory bandwidth by allowing multiple memory operations to be processed in parallel across different memory areas. In addition, it reduces memory access latency by minimizing contention for any single memory area, thereby decreasing queuing delays. Furthermore, it enables more efficient utilization of cache resources by allowing programs to potentially use more cache capacity than would be available in a single cache area. In addition, it helps balance the load across memory resources, preventing any single component from becoming a performance bottleneck while others remain underutilized.

Some memory controllers apply a global address transformation function, also referred to as "scrambling function," to distribute outgoing memory requests across the available independent memory areas. As used herein, the term "address transformation function" refers to a function that maps a linear range of memory addresses to one or more physical memory areas. For brevity, henceforth the terms "address transformation function," "transformation function," and "distribution function" are used interchangeably.

SUMMARY

It is an object of some embodiments described in the present disclosure to provide a system and a method for distributing memory accesses in a computerized system. In such embodiments transformation mode values are used to identify address transformation functions, and each memory access request is associated with a transformation mode value that is indicative of an address transformation function for the memory access request. In such embodiments, transformation circuitry is configured to receive a memory access request and access a transformation mode value that is associated with the memory access request and apply the address transformation function that is indicated by the transformation mode value to an address of the memory access request such that a memory area may serve a new memory access request according to the transformed memory address.

Using a transformation mode value associated with the memory access request allows using different address transformation functions for different memory access requests, allowing more control over distribution of all the memory access requests in the computerized system. Controlling the distribution of memory access requests in the computerized system facilitates reducing overall latency of the memory access requests and additionally or alternatively reducing latency of a subset of the memory access requests and additionally or alternatively improving one or more memory access metrics in the computerized system, thus improving overall performance of the computerized system by one or more performance metrics.

The foregoing and other objects are achieved by the features of the independent claims. Further implementation forms are apparent from the dependent claims, the description and the figures.

According to a first aspect, a system for accessing memory comprises: transformation circuitry configured to: receive a memory access request; access a transformation mode value associated with the memory access request and indicative of an address transformation function; apply the address transformation function, indicated by the transformation mode value, to a memory address of the memory access request to compute a transformed memory address; and generate a new memory access request using the memory access request and the transformed memory address; and at least one memory area configured to serve the new memory access request according to the transformed memory address.

According to a second aspect, a method for accessing memory comprises: receiving a memory access request; accessing a transformation mode value associated with the memory access request and indicative of an address transformation function; applying the address transformation function, indicated by the transformation mode value, to a memory address of the memory access request to compute a transformed memory address; generating a new memory access request using the memory access request and the transformed memory address; and serving the new memory access request by at least one memory area according to the transformed memory address.

According to a third aspect, a software program product for accessing memory comprises: a non-transitory computer readable storage medium; first program instructions for receiving a memory access request; second program instructions for accessing a transformation mode value associated with the memory access request and indicative of an address transformation function; third program instructions for applying the address transformation function, indicated by the transformation mode value, to the memory address of the memory access request to compute a transformed memory address; fourth program instructions for generating a new memory access request using the memory access request and the transformed memory address; and fifth program instructions for serving the new memory access request by at least one memory area according to the transformed memory address; wherein the first, second, third, fourth, and fifth program instructions are executed by at least one computerized processor from the non-transitory computer readable storage medium.

With reference to the first and second aspects, in a first possible implementation of the first and second aspects generating the new memory access request comprises replacing the memory address with the transformed memory address in the memory access request. Replacing the memory address with the transformed memory address facilitates serving the new memory access request by components configured to serve the memory access request, simplifying system design and reducing costs of system implementation as optionally no bespoke components are required to serve the new memory access request.

With reference to the first and second aspects, in a second possible implementation of the first and second aspects the system further comprises map selection circuitry configured to: determine the transformation mode value based on the memory access request; and provide the transformation circuitry with an association between the transformation mode value and the memory access request. Using map selection circuitry facilitates applying different transformations to different memory access requests, allowing greater control over shaping distribution of the plurality of memory access requests of the system compared to applying a fixed transformation to all requests, thus facilitating a greater increase is system performance, for example greater throughput or reduced latency, compared to applying a fixed transformation to all requests. Optionally, the map selection circuitry is further configured to insert the transformation mode value into the memory access request. Optionally, the map selection circuitry provides the association between the transformation mode value and the memory access request by inserting the transformation mode value into the memory access request; and optionally the transformation circuitry accesses the transformation mode value by extracting the transformation mode value from the memory access request. Inserting the transformation mode value into the memory access request provides a means of providing the transformation mode value to the transformation circuitry without explicit configuration for each memory access request, reducing complexity and increasing accuracy of the system's operation compared to implementing a separate channel for providing the transformation mode value to the transformation circuitry and associating the transformation mode value correctly with the memory access request. Optionally, the map selection circuitry inserts the transformation mode value into the memory address in the memory access request. Optionally, the transformation circuitry is further configured to remove the transformation mode value from the memory access request when generating the new memory access request. Using the memory address for providing the transformation mode value allows providing the transformation mode value to the transformation circuitry without changing the format of the memory access request, allowing use of existing memory interconnect infrastructures, thus reducing cost of implementation of a system implementing the present invention. Optionally, the map selection circuitry further comprises a mapping storage for storing at least one association between one or more memory access parameters and a transformation mode value. Optionally, the map selection circuitry determining the transformation mode value based on the memory access request comprises: computing at least one additional memory access parameter according to the memory access request; and optionally accessing the transformation mode value in the mapping storage according to the at least one additional memory access parameter. Optionally, the system further comprises at least one hardware processor configured to configure the at least one association in the mapping storage of the map selection circuitry.

With reference to the first and second aspects, in a third possible implementation of the first and second aspects the system further comprises a plurality of processing cores connected to a plurality of memory areas, wherein the at least one memory area is a member of the plurality of memory areas. Optionally the system further comprises at least one additional hardware processor configured to configure the address transformation function in the map selection circuitry. Optionally, the map selection circuitry and the transformation circuitry are associated with at least one processing core of the plurality of processing cores. Associating the map selection circuitry and additionally or alternatively the transformation circuitry with one or more processing cores allows configuring different address translation functions for each of the plurality of processing cores, allowing configuring different address translation functions for each software application, according to a processing core executing at least part of the software application. This has the benefit of allowing increased control over the pattern of distribution of the plurality of memory access requests, facilitating increasing performance of the system by one or more system performance metrics. Optionally, the map selection circuitry further comprises a mapping storage for storing at least one association between one or more memory access parameters and a transformation mode value. Optionally, configuring the address transformation function in the map selection circuitry comprises adding to the mapping storage an association between at least one memory access parameter and the transformation mode value, where the at least one memory access parameter is computed using the memory access request. Optionally, the plurality of processing cores are implemented in a reconfigurable processing grid comprising a plurality of reconfigurable logical elements connected via a plurality of reconfigurable routing junctions. Optionally, the reconfigurable processing grid comprises at least some of the plurality of memory areas. Using a reconfigurable processing grid allows dynamic configuration during runtime, allowing adapting performance improvements to changing system conditions, facilitating increasing total performance improvements over time.

With reference to the first and second aspects, or the third implementation of the first and second aspects, in a fourth possible implementation of the first and second aspects the at least one processing core is configured to execute a software application; wherein executing the software application comprises issuing a plurality of memory access requests; and wherein configuring the address transformation function comprises configuring the map selection circuitry to use for each of the plurality of memory access requests an identified transformation mode value as the transformation mode value used to generate the new memory access request therefor. Optionally, the system further comprises at least one page table associated with the at least one processing core, the at least one page table comprising a plurality of page table entries (PTEs). Optionally, the at least one processing core is configured to execute a software application. Optionally, application memory of the software application is organized in a plurality of application memory pages, each of the plurality of application memory pages mapped to at least one of the plurality of memory areas via at least one PTE of the plurality of PTEs. Optionally, executing the software application comprises issuing a plurality of memory access requests to the plurality of application memory pages. Optionally, configuring the address transformation function comprises: for each application memory page of the plurality of application memory pages, storing in the at least one PTE mapping the application memory page a page-specific transformation mode value indicative of one of a plurality of address transformation functions; and configuring the map selection circuitry to use the page-specific transformation mode value of a PTE of the plurality of PTEs as the transformation mode value when the memory address is in the at least one application memory page mapped by the PTE. Optionally, the at least one additional hardware processor is further configured to: modify the page-specific transformation mode value for a first application memory page of the plurality of application memory pages; and copy data of the first application memory page according to a new address transformation function indicated by the modified page-specific transformation mode value. Optionally, the address transformation function indicated by the page-specific transformation mode value is selected based on at least one memory access metric of the application memory page. Optionally, the at least one memory access metric comprises at least one of: a bandwidth requirement of the application memory page, a latency requirement of the application memory page, a balance requirement of a port accessing the application memory page, a balance requirement between accesses to the at least one of the plurality of memory areas to which the application memory page is mapped, or a measure of network congestion between the plurality of processing cores and the plurality of memory areas. Selecting the address transformation function based on one or more memory access metrics allows flexibility in improving performance of the system according to different metrics, thus increasing usability of the system. Using a PTE to store a transformation mode value allows associating a range of memory addresses of the page mapped by the PTE and the page-specific transformation value without requiring bespoke mapping storage, reducing cost of implementation of the system. In addition, using the PTE allows associating different transformation mode values to different pages without requiring bespoke mapping storage and additionally or alternatively bespoke circuitry to compute an association between a memory access request and a transformation mode value when retrieving the transformation mode value associated with the memory access request.

With reference to the first and second aspects, or the third implementation of the first and second aspects, in a fifth possible implementation of the first and second aspects the address transformation function is one of a plurality of address transformation functions. Optionally, the at least one processing core is configured to execute a software application. Optionally, application memory of the software application is organized in a plurality of application memory pages. Optionally, each of the plurality of address transformation functions defines a distribution pattern of an application memory page of the plurality of application memory pages across the plurality of memory areas. Optionally, each memory area of the plurality of memory areas is associated with one or more memory storage entities of a plurality of memory storage entities, the one or more memory storage entities storing at least part of the memory area, wherein the plurality of memory storage entities is one of: a plurality of cache bins or a plurality of random access memory banks. Optionally, the distribution pattern of the application memory page across the plurality of memory areas corresponds to a pattern of distribution of a plurality of application memory addresses of the application memory page across the plurality of memory storage entities. Optionally, the plurality of memory storage entities is organized topologically in a two-dimensional grid (memory storage grid). Optionally, the pattern of distribution across the plurality of memory storage entities comprises a rectangular shape spanning a first number of memory storage entities in a first dimension of the memory storage grid and a second number of memory storage entities in a second dimension of the memory storage grid. Optionally, the plurality of memory storage entities is a plurality of cache bins. Optionally, the at least one additional hardware processor is further configured to select the address transformation function from the plurality of address transformation functions such that the address transformation function distributes the application memory page of the plurality of application memory pages across multiple cache bins of the plurality of cache bins in response to detecting that the application memory page is being accessed by multiple processing cores of the plurality of processing cores concurrently. Optionally, the at least one additional hardware processor is further configured to select the address transformation function from the plurality of address transformation functions such that the address transformation function concentrates an application memory page of the plurality of application memory pages within a reduced number of cache bins of the plurality of cache bins in response to detecting that the application memory page is being accessed primarily by a single processing core of the plurality of processing cores. Optionally, each memory area of the plurality of memory areas is associated with one or more memory access entities of a plurality of memory access entities, the one or more memory access entities controlling access to the memory area, wherein the plurality of memory access entities is one of: a plurality of HBM controllers, a plurality of cache controllers, or a plurality of double data rate (DDR) controllers. Optionally, the distribution pattern of the application memory page across the plurality of memory areas corresponds to another pattern of distribution of a plurality of application memory addresses of the application memory page across the plurality of memory access entities. Optionally, the plurality of memory access entities is organized topologically in another two-dimensional grid (memory access grid). Optionally, the other pattern of distribution across the plurality of memory access entities comprises a rectangular shape spanning a first number of memory access entities in a first dimension of the memory access grid and a second number of memory access entities in a second dimension of the memory access grid. When memory areas, for example memory access entities or memory storage entities, are organized in a two-dimensional grid, using a transformation function that defines a pattern of distribution that has a rectangular shape allows controlling how the plurality of memory access requests is distributed over one or more communication channels of each dimension, allowing to direct fewer requests to channels less loaded than others, and additionally or alternatively directing more requests to other channel having a shorter latency, as the need may be.

With reference to the first and second aspects, or the third implementation of the first and second aspects, in a sixth possible implementation of the first and second aspects the at least one processing core is configured to execute a software application. Optionally, application memory of the software application is organized in a plurality of application memory pages. Optionally, configuring the address transformation function further comprises: collecting a plurality of memory access statistical values during execution of the software application; and optionally configuring the address transformation function based on the plurality of memory access statistical values. Optionally, the system further comprises at least one page table associated with the at least one processing core, the at least one page table comprising a plurality of page table entries (PTEs). Optionally, each of the plurality of application memory pages is mapped to at least one of the plurality of memory areas via at least one PTE of the plurality of PTEs. Optionally, configuring the address transformation function further comprises for each application memory page of the plurality of application memory pages: selecting a page-specific transformation mode value based on the plurality of memory access statistical values, where the page-specific transformation mode value is indicative of one of a plurality of address transformation functions; and optionally storing the selected page-specific transformation mode value in the at least one PTE mapping the application memory page. Optionally, the plurality of memory access statistical values comprises at least one of: a count of accesses to an application memory page, an identification of a processing core accessing the application memory page, a pattern of memory accesses to the application memory page, a count of accesses to a range of memory addresses of the plurality of memory areas from at least one identified memory access instruction, a cache-hit rate of a range of memory addresses of the plurality of memory areas from the at least one identified memory access instruction, a cache-miss rate of a range of memory addresses of the plurality of memory areas from the at least one identified memory access instruction, a count of accesses of an identified access type, and a round-trip latency of an access to a range of memory addresses of the plurality of memory areas from the at least one identified memory access instruction. Optionally, the system further comprises a telemetry collector configured to collect the plurality of memory access statistical values. Optionally the system further comprises a memory manager configured to select the address transformation function for each application memory page based on the collected memory access statistics. Optionally, the memory manager is further configured to dynamically modify the address transformation function during execution of the software application responsive to changes in the plurality of memory access statistical values. Collecting statistics allows tailoring the system's configuration to changes in the system's execution patterns, thus facilitating maintaining increased system performance over time.

With reference to the first and second aspects, in a seventh possible implementation of the first and second aspects the transformation circuitry further comprises another mapping storage for storing at least one other association between one or more other memory access parameters and another transformation mode value. Optionally, the transformation circuitry is further configured to: compute at least one other additional memory access parameter according to the new memory access request; and optionally access the transformation mode value in the other mapping storage according to the at least one other additional memory access parameter. Optionally, the system further comprises at least one other hardware processor configured to configure the at least one other association in the other mapping storage of the transformation circuitry.

With reference to the first and second aspects, in an eighth possible implementation of the first and second aspects applying the address transformation function comprises: determining a linear page address for the memory address, where the linear page address represents a unique sequential range of memory addresses (unique page) before any distribution transformation is applied; and applying a pattern-specific transformation to address bits within a page of memory according to the transformation mode value. Optionally, the at least one memory area is a member of a plurality of memory areas. Optionally, the pattern-specific transformation distributes a plurality of memory accesses within the page of memory among at least some of the plurality of memory areas. Optionally, the address transformation function comprises a bit transposition operation applied to at least part of the memory address.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIG. 4 is a flowchart schematically representing an optional flow of operations for determining a transformation mode value, according to some embodiments;

FIG. 5 is a flowchart schematically representing an optional flow of operations for applying an address transformation function, according to some embodiments;

DETAILED DESCRIPTION

Figure 1:
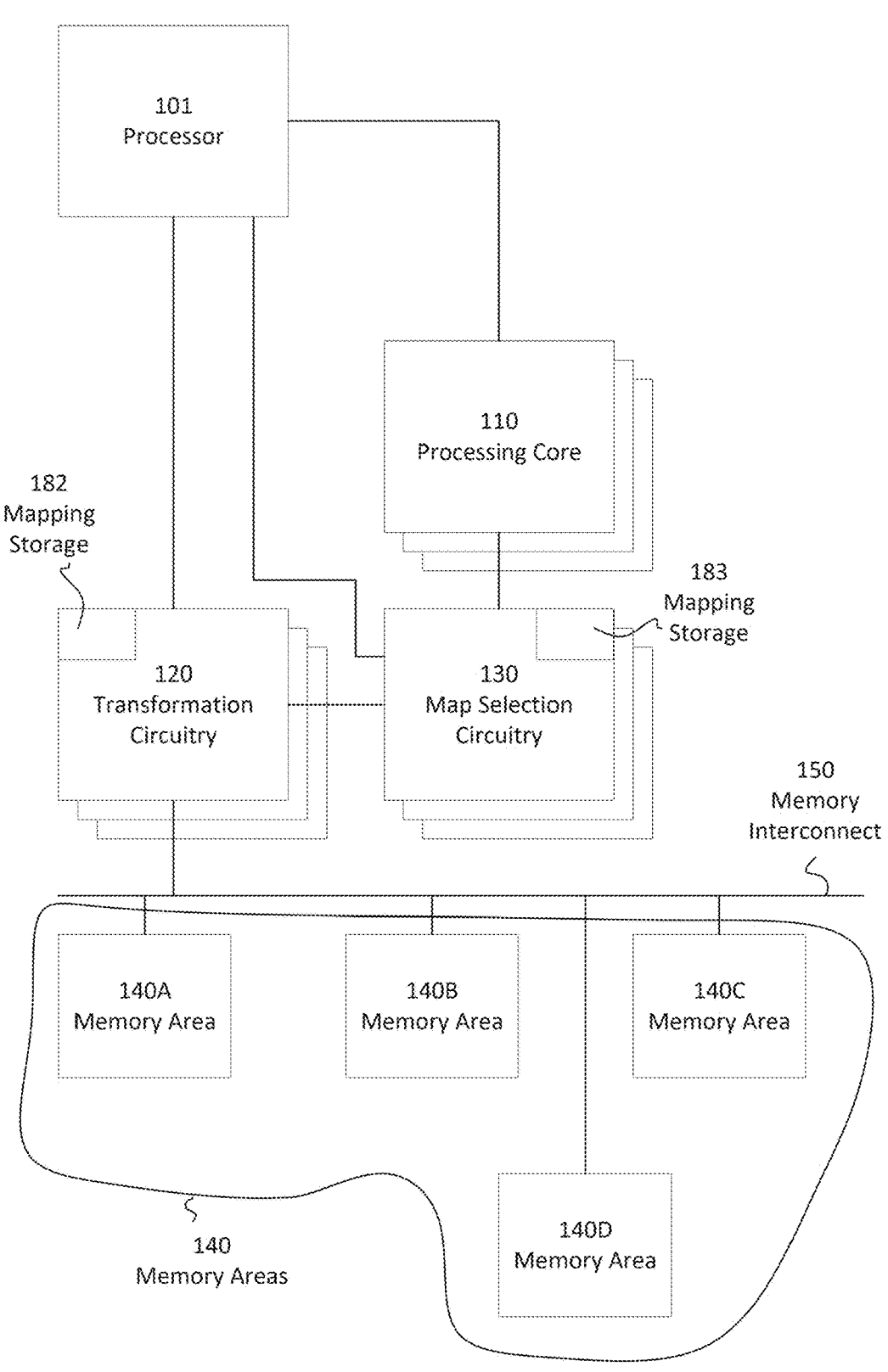
FIG. 1 is a schematic block diagram of an exemplary system, according to some embodiments.

Memory address transformation, that maps a linear range of memory addresses to one or more physical memory areas, may be used to distribute memory accesses between multiple physical memory areas in a way that improves total performance of the memory subsystem. This improvement can manifest as reduced latency when accessing multiple HBM or DRAM channels, memory banks, and pages in memory banks, as well as increased likelihood of cache hits.

However, the inventors have found that there is no universal mapping solution that applies optimally to all systems, or even to all applications or memory pages within the same system. This is because memory access patterns vary significantly between systems and even within the same system or application over time. Current solutions employ a preset mapping according to a fixed configuration of the relevant hardware, which typically represents a compromise based on general purpose benchmarks.

The memory architecture of a computerized system needs to decide how to spread each page across different memory areas, considering several factors. Distributing a page over many memory areas achieves better memory bandwidth (as several memory areas share the load) but potentially sacrifices locality (memory requests may need to travel a longer distance before reaching the relevant memory areas). If the memory areas have cache, distributing a page also potentially allows it to use more cache capacity.

A conventional approach to distributing memory requests across the available independent memory areas employs a fixed global distribution function that is preset according to the hardware configuration of the memory sub-system. This global function applies the same transformation to all memory addresses, regardless of the specific access patterns associated with different memory pages or applications. While this approach provides some improvement in memory sub-system performance, it represents a compromise that attempts to balance between different memory clients based on general-purpose benchmarks.

The impact of any transformation function depends on the original address pattern, and therefore no single global transformation can be ideal for all applications or even for all memory pages within the same application. This limitation of existing systems arises because different pages have different access patterns, and a global distribution function would either optimize for bandwidth at the expense of locality, or optimize for locality at the expense of bandwidth, resulting in suboptimal performance for many memory access patterns. For example, pages that are accessed by multiple processing units in parallel would benefit from being spread over more memory areas to satisfy bandwidth requirements, while pages that are primarily accessed by a single processing unit would benefit from better locality to reduce access latency.

There exist other approaches for improving memory performance, such as techniques that interleave memory from multiple execution threads in a shared cache line, which can be effective for certain workloads. However, such approaches do not address the fundamental limitations of having a single, fixed distribution scheme applied to all memory pages.

As used herein, the term "memory access distribution" refers to the process of allocating memory access operations across multiple physical memory areas to optimize system performance. An address transformation function may be used to define a memory access distribution pattern. Applying an address transformation function to a plurality of memory access requests distributes the plurality of memory access requests among the plurality of memory areas according to the memory access distribution pattern.

As used herein, the term "transformation mode value" refers to a digital representation that indicates a specific address transformation function to be applied to a memory address of a memory access request. In addition, for brevity, henceforth the term "system" is used to mean a computerized system and unless otherwise noted the terms "system" and "computerized system" are used interchangeably.

The present disclosure, in some embodiments described herewithin, addresses the technical problem of enhancing memory sub-system performance. The present disclosure addresses the limitations of conventional memory sub-systems by providing systems and methods for configurable and differential address transformation to optimize memory access distribution of a plurality of memory access requests issued when executing one or more software applications by a computerized system. Such systems and methods facilitate enhanced memory sub-system performance through fine-grained control over how memory accesses are distributed across available memory areas in the system.

In such embodiments, this fine-grained control is achieved by selective application of a transformation function to an address in a memory access request based on one or more memory access parameters that are contextual to the memory access request. Some such memory access parameters include, but are not limited to: an application identifier, a page identifier, an address range, a cache bit, a processing core identifier, a part of an address, a process identifier, and a thread identifier. By allowing transformation selection to be based on one or more parameters that are contextual to the memory access request, the system achieves increased flexibility in memory access optimization tailored to specific execution contexts compared to existing methods, which increases performance of the one or more software applications. By allowing dynamic configuration of address transformation while the system executes the one or more software applications, optionally without disrupting execution of the one or more software applications, the system achieves even further enhanced memory sub-system performance by adapting to changes over time in memory access patterns and thus increases performance of the one or more software applications.

To do so, the present disclosure in some embodiments described herewithin, proposes associating each memory access request of a plurality of memory access requests with a transformation function by using a transformation mode value that is associated with the memory access request and is indicative of the memory transformation associated therewith. Optionally, the association between the memory access request and the transformation mode value is based on the one or more memory access parameters that are contextual to the memory access request. Some examples of a memory access parameter include, but are not limited to: a processing core identifier, an address range, a part of an address, a process identifier, a thread identifier, or a cache bit.

As used herein, the term "processing core" refers to a computational unit capable of executing instructions and performing operations on data. A processing core may be, but is not limited to, a central processing unit (CPU) core, a graphics processing unit (GPU) core, a digital signal processor (DSP) core, a neural processing unit (NPU), a tensor processing unit (TPU), a field-programmable gate array (FPGA) processing element, or any other computational element capable of executing instructions and generating memory access requests.

A processing core may be implemented as part of a multicore processor, wherein multiple cores are integrated into a single integrated circuit to enhance computational parallelism. Optionally, a processing core is distributed across multiple physical chips or packages in a computing system. Some examples of processing cores include x86 CPU cores, ARM CPU cores, NVIDIA CUDA cores, AMD compute units, Intel execution units, RISC-V cores, and custom arithmetic logic units (ALUs) designed for specific computational tasks. A processing core may be implemented in a reconfigurable processing grid, where the reconfigurable processing grid comprises a plurality of reconfigurable logical elements connected via a plurality of reconfigurable routing junctions. Optionally, a processing core comprises at least some of the plurality of reconfigurable logical elements and at least some of the plurality of reconfigurable routing junctions.

Optionally, a processing core is associated with dedicated or shared cache memory to reduce memory access latency.

Processing cores may vary in their architectural complexity, instruction set support, performance characteristics, power consumption, and specialized capabilities, but all share the common function of performing computational operations that may require access to memory areas.

Some examples of a memory area include, but are not limited to: a memory component directly coupled to one or more processing cores, a memory component connected to the one or more processing cores via a bus, and a memory component connected to the one or more processing cores via an exchange.

For brevity, unless otherwise noted the term "application" is used to mean "software application" and the terms are used interchangeably.

In some embodiments described herewithin, transformation circuitry is configured to receive a memory access request from a processing core of a plurality of processing cores of the system, where the plurality of processing cores are connected to a plurality of memory areas of the system. Optionally, the memory access request comprises a memory address identifying a location in a memory area of the plurality of memory areas of the system. Optionally, the memory access request is one of: a read request, a write request, or an atomic operation request.

Upon receipt of the memory access request, in such embodiments the transformation circuitry accesses a transformation mode value associated with the memory access request. The transformation mode value is indicative of an address transformation function to be applied to the memory address of the memory access request. Optionally, the transformation mode value is encoded as a plurality of bits within the memory access request and the transformation circuitry extracts the transformation mode value from the memory access request. Optionally, the transformation circuitry retrieves the transformation mode value from a mapping storage based on one or more memory access parameters of the memory access request. Optionally, the transformation circuitry comprises the mapping storage.

Optionally, the transformation circuitry applies the address transformation function indicated by the transformation mode value to the memory address of the memory access request to compute a transformed memory address.

As used herein, the term "linear memory address" refers to a memory address within a linear address space that represents a unique sequential range of memory addresses before any distribution transformation is applied. A linear memory address may serve as an intermediate addressing stage between virtual addressing and physical addressing. The transformation function may be applied to any type of memory address, for example a virtual memory address, a linear memory address, and a physical memory address. Optionally, applying the address transformation function comprises performing one or more bit manipulation operations on the memory address, wherein such operations may include, but are not limited to, bit transposition, bit swapping, bit toggling, and applying one or more exclusive-OR (XOR) operations with one or more predetermined patterns. After computing the transformed memory address, the transformation circuitry optionally generates a new memory access request using the memory access request and the transformed memory address. Optionally, generating the new memory access request comprises replacing the original memory address with the transformed memory address in the memory access request. Optionally, generating the new memory access request further comprises removing the transformation mode value from the request, for example if it was previously inserted therein. In such embodiments, at least one memory area of the plurality of memory areas of the system is configured to serve the new memory access request according to the transformed memory address. Serving the new memory access request may include reading data from the at least one memory area, writing data to the at least one memory area or performing an atomic operation on the at least one memory area, for example both reading from and writing to the at least one memory area.

In addition, in some embodiments described herewithin the system further comprises map selection circuitry configured to determine the transformation mode value based on the memory access request and optionally provide the transformation circuitry with an association between the transformation mode value and the memory access request. Optionally, the map selection circuitry provides the association between the transformation mode value and the memory access request to the transformation circuitry by inserting the transformation mode value into the memory access request. When the map selection circuitry inserts the transformation mode value into the memory access request, the transformation circuitry optionally accesses the transformation mode value by extracting the transformation mode value from the memory access request. Optionally, the map selection circuitry inserts the transformation mode value into the memory address in the memory access request.

Optionally, the map selection circuitry stores one or more associations, each between one or more other memory access parameters and a transformation mode value. Optionally, an application executed by a processing core of the plurality of processing cores of the system is identified by the processing core identifier of the processing core executing the application.

Optionally, to determine the transformation mode value based on the memory access request the map selection circuitry computes one or more additional memory access parameters according to the memory access request and accesses the transformation mode value in a mapping storage (accessible to the map selection circuitry) according to the one or more additional memory access parameters. For example, the map selection circuitry may compute a memory range from a memory address in the memory access request and additionally or alternatively compute a processing core identifier from metadata in the memory access request, and use the memory range and additionally or alternatively the processing core identifier to access the transformation mode value in the mapping storage.

A mapping storage may be implemented using any suitable data organization format, including, but not limited to, an array, an indexed table, a hash table, a linked list, a tree-based structure, or any other data structure capable of storing associations between one or more memory access parameters and a corresponding transformation mode value. Optionally the mapping circuitry comprises the mapping storage. Optionally, the mapping storage is implemented as at least part of other memory management entities, for example a page table.

Optionally, the map selection circuitry and the transformation circuitry are associated with at least one processing core of the plurality of processing cores. Optionally, each of the plurality of processing cores has their own map selection circuitry and additionally or alternatively transformation circuitry.

Optionally, the plurality of processing cores execute one or more software applications. Optionally, each application of the one or more software applications is executed by a subset of the plurality of processing cores. Optionally, an address transformation function describes a distribution pattern for an application memory page. A distribution pattern determines how the application memory page is spread across multiple memory areas. Each distribution pattern is encoded as a transformation function that operates on the memory address.

When the plurality of memory areas is organized in a two-dimensional grid, some distribution patterns are a rectangular shape spanning a specified number of memory areas in each dimension of the memory grid. For example, a 1×1 pattern keeps an entire application memory page within a single memory area. This pattern is optionally used to optimize for locality. In another example, a 2×2 pattern distributes the application memory page across four memory areas in a square arrangement, balancing locality and bandwidth. In yet another example, 4×1 pattern distributes the application memory page across four memory areas horizontally, which may optimize for certain types of sequential access patterns. In yet another example, a 1×4 pattern distributes the application memory page vertically, which may be beneficial for different access patterns or to avoid network congestion.

Optionally, the system further comprises a plurality memory storage entities. Some examples of a memory storage entity include, but are not limited to, a cache, a cache bin, a scratchpad and a random access memory bank, for example a HBM bank, a dynamic random-access memory (DRAM) and a synchronous dynamic random-access memory (SDRAM). A scratchpad may be a static random access memory (SRAM). Optionally, at least part of a memory area is stored in one or more memory storage entities of the plurality of memory storage entities and the memory area is associated with the one or more memory storage entities. Optionally, the plurality of memory areas is organized in a grid by organizing the plurality of memory storage entities in a grid. Optionally, the distribution pattern of the application memory page across the plurality of memory areas corresponds to another pattern of distribution of a plurality of application memory addresses of the application memory page across the plurality of memory storage entities.

Optionally, the system further comprises a plurality of memory access entities that control access to the plurality of memory areas. Some examples of a memory access entity include, but are not limited to, a HBM controller, a cache controller, a double data rate (DDR) controller and a DRAM controller providing access to a memory component. Optionally, a memory area is associated with one or more memory access entities of the plurality of memory access entities that control access to the memory area. Optionally, the plurality of memory areas is organized in a grid by organizing the plurality of memory access entities in a grid. Optionally, the distribution pattern of the application memory page across the plurality of memory areas corresponds to yet another pattern of distribution of the plurality of application memory addresses of the application memory page across the plurality of memory access entities.

Optionally, a common transformation function is used for all of a set of memory access requests issued by an application. In this case, the common transformation function is associated with an identified transformation mode value. Optionally, one or more map selection circuitries associated with the subset of the plurality of processing cores executing the software application are configured to use the identified transformation mode value as the transformation mode value used to generate a new memory access request for each of the set of memory access requests.

Optionally, when application memory accessed by a software application is organized into a plurality of application memory pages, each application memory page of the plurality of application memory pages is associated with a corresponding page-specific transformation function. Optionally, some application memory pages of the plurality of application memory pages are associated with a first transformation function, while other application memory pages of the plurality of application memory pages are associated with a second, different transformation function, and so on. Optionally, each page-specific transformation function is selected from a set of transformation functions. Optionally, each page-specific transformation function is associated with a corresponding page-specific transformation mode value, such that the transformation mode value is also associated with the respective application memory page. Optionally, for each application memory page of the plurality, one or more map selection circuitries associated with a subset of the plurality of processing cores executing the software application are configured to use the page-specific transformation mode value associated with the application memory page as the transformation mode value used to generate a new memory access request for a memory access request of the set of memory access requests that targets the application memory page.

Optionally, the address transformation function indicated by the page-specific transformation mode value is selected based on one or more memory access metrics of the application memory page. A memory access metric may be a bandwidth requirement of the application memory page or a latency requirement of the application memory page. A memory access metric may be a balance requirement between accesses to one or more memory areas to which the application memory page is mapped. Optionally, a memory access metric is a measure of network congestion between the plurality of processing cores and the plurality of memory areas. When at least some of the plurality of memory areas are accessed via a port, a memory access metric may be a balance requirement of the port, for example a balance requirement between a number of requests and a number of responses via the port. For example, a latency requirement could lead to a locality requirement, distributing the application memory page in memory areas that are local to the processing core executing the application. Additionally or alternatively, changing from a horizontal to a vertical layout may solve network congestion issues under certain conditions.

Optionally, an association between a transformation mode value and an address transformation function is not uniform across the system. For example, an identified number of binary bits may be used to create values that identify an identified number of functions. For example two binary bits may be used to identify four transformation functions, or three binary bits may be used to identify eight transformation functions. However, transformation functions may be application specific. Thus, a first set of functions associated with a first plurality of application memory pages of a first application may be different from a second set of functions associated with a second plurality of application memory pages of a second application. Optionally, an identified transformation mode value identifies a first function in the first set of functions and a second function in the second set of functions, however the first function is different from the second function. Optionally, a first set of map selection circuitries associated with a first set of processing cores executing the first application comprises a first association between the identified transformation mode value and the first function, while a second set of map selection circuitries associated with a second set of processing cores executing the second application comprises a second association between the identified transformation mode value and the second function.

Optionally the system comprises one or more page tables associated with the set of processing cores, the one or more page tables comprising a plurality of page table entries (PTEs). Optionally, each of the plurality of application memory pages is mapped to at least one of the plurality of memory areas via at least one PTE of the plurality of PTEs. Optionally, the PTE is used to store an association between an application memory page and a corresponding page-specific transformation value, such that a page-specific transformation mode value associated with at least one application memory page is stored in at least one PTE of the plurality of PTE that maps the at least one application memory page. Optionally, the map selection circuitry accesses the PTE to determine the transformation mode value for a memory access request such that the PTE serves as at least part of the mapping storage of the map selection circuitry.

Optionally, the association between the application memory page and the corresponding page-specific transformation value is stored in a translation lookaside buffer (TLB).

Optionally, a map selection circuitry is configured to use a transformation mode value by configuring a mapping storage accessible by the map selection circuitry. Similarly, a transformation circuitry may be configured to use a transformation mode value by configuring another mapping storage accessible by the transformation circuitry.

It should be appreciated that while the descriptions of configuration of the mapping storage focus on a mapping storage that is accessed by a map selection circuitry, the same configurations can be applied to a mapping storage that is accessed by a transformation circuitry, and the same considerations may be applied. Optionally, the system further comprises at least one hardware processor configured to configure the one or more associations in the mapping storage of the map selection circuitry. Optionally, the at least one hardware processor configures the one or more associations based on observed memory access patterns. Additionally or alternatively, the at least one hardware processor may be configured to configure the one or more associations in the mapping storage of the transformation circuitry.

Optionally, the at least one hardware processor configures one or more address transformation functions in the transformation circuitry. Optionally, the at least one hardware processor configures in the transformation circuitry one or more associations between a transformation mode value and an address transformation function.

Optionally, the observed memory access patterns are derived from telemetry data collected during system operation. Optionally, the system further comprises a telemetry collector configured to collect the telemetry data. Optionally, the telemetry data comprises a plurality of memory access statistical values. Optionally, the system further comprises a memory manager configured to select the address transformation function for each application memory page based on the collected telemetry data. Some examples of a memory access statistical value include, but are not limited to: a count of accesses to an application memory page, an identification of a processing core accessing the application memory page, a pattern of memory accesses to the application memory page, a count of accesses to a range of memory addresses of the plurality of memory areas from one or more identified memory access instructions, a cache-hit rate of a range of memory addresses of the plurality of memory areas from the one or more identified memory access instructions, a cache-miss rate of a range of memory addresses of the plurality of memory areas from the one or more identified memory access instructions, a count of accesses of an identified access type, and a round-trip latency of an access to a range of memory addresses of the plurality of memory areas from the at least one identified memory access instruction. Optionally, the one or more identified memory access instructions are from a plurality of instructions of the software program.

In addition, some embodiments described herewithin propose updating the configuration of the transformation functions based on the telemetry data. In such embodiments, the at least one hardware processor is configured to update at least one mapping between one or more memory access parameters and a transformation mode value according to the telemetry data. Optionally, the at least one hardware processor updates at least one association between a transformation mode value and a transformation function according to the telemetry data. Optionally, the at least one hardware processor creates a new transformation function according to the telemetry data and configures the transformation circuitry to apply the new transformation function.

Through these mechanisms, the present disclosure provides systems and methods for configurable address transformation that optionally significantly enhance memory system performance by allowing for optimization of memory access patterns at a granularity not previously available. The ability to dynamically select and modify transformation functions on a per-application or per-page basis, guided by telemetry data collection and analysis, enables the system to adapt to the specific memory access patterns of different applications and memory pages, optionally resulting in improved bandwidth, reduced latency, and more efficient use of cache resources.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, a plurality of processing cores 110 is connected to a plurality of memory areas 140, comprising in this example memory area 140A, memory area 140B, memory area 140C and memory area 140D. Optionally, plurality of processing cores 110 is connected to plurality of memory areas 140 via memory interconnect 150. Memory interconnect 150 may comprise one or more buses. Optionally, memory interconnect 150 comprises one or more exchanges. Optionally, memory interconnect 150 comprises one or more memory access entities. Some examples of a memory access entity include, but are not limited to, a HBM controller, a cache controller, a double data rate (DDR) controller and a DRAM controller providing access to a memory component. Optionally, memory interconnect 150 electrically couples one or more of plurality of memory areas 140 with plurality of processing cores 110, for example when a memory area is a cache memory area.

Optionally, system 100 comprises transformation circuitry 120. Optionally, system 100 comprises more than one transformation circuitry. Optionally, transformation circuitry 120 is associated with one or more processing cores of the plurality of processing cores 110. Optionally, at least one of the plurality of processing cores 110 is connected to the plurality of memory areas 140 via transformation circuitry 120.

Optionally, system 100 comprises map selection circuitry 130. Optionally, system 100 comprises more than one map selection circuitry. Optionally, map selection circuitry 130 is associated with the one or more processing cores. Optionally, at least one of the plurality of processing cores 110 is connected to the plurality of memory areas 140 via map selection circuitry 130. Optionally, map selection circuitry 130 is connected to transformation circuitry 120.

When system 100 comprises more than one transformation circuitry, map selection circuitry 130 may be connected to at least one other transformation circuitry of the more than one transformation circuitry. When system 100 comprises more than one map selection circuitry, transformation circuitry 120 may be connected to at least one other map selection circuitry of the more than one map selection circuitry. Optionally, each of the one or more transformation circuitries and each of the one or more map selection circuitries are associated with at least one of the plurality of processing cores 110.

Optionally, map selection circuitry 130 comprises a mapping storage 183.

Optionally, transformation circuitry 120 comprises another mapping storage 182.

Optionally, mapping storage 182, and additionally or alternatively other mapping storage 183, store one or more associations between one or more memory access parameters and a transformation mode value.

Optionally, system 100 comprises at least one hardware processor 101, connected to transformation circuitry 120 and map selection circuitry 130. Optionally, at least one hardware processor 101 is connected to the plurality of processing cores 110.

For brevity, henceforth the term "processing unit" is used to mean "at least one hardware processor", and the terms are used interchangeably. The processing unit may be any kind of programmable or non-programmable circuitry that is configured to carry out the operations described above and below. The processing unit may comprise hardware as well as software. For example, the processing unit may comprise one or more processors and a transitory or non-transitory memory that carries a program which causes the processing unit to perform the respective operations when the program is executed by the one or more processors.

Figure 2:
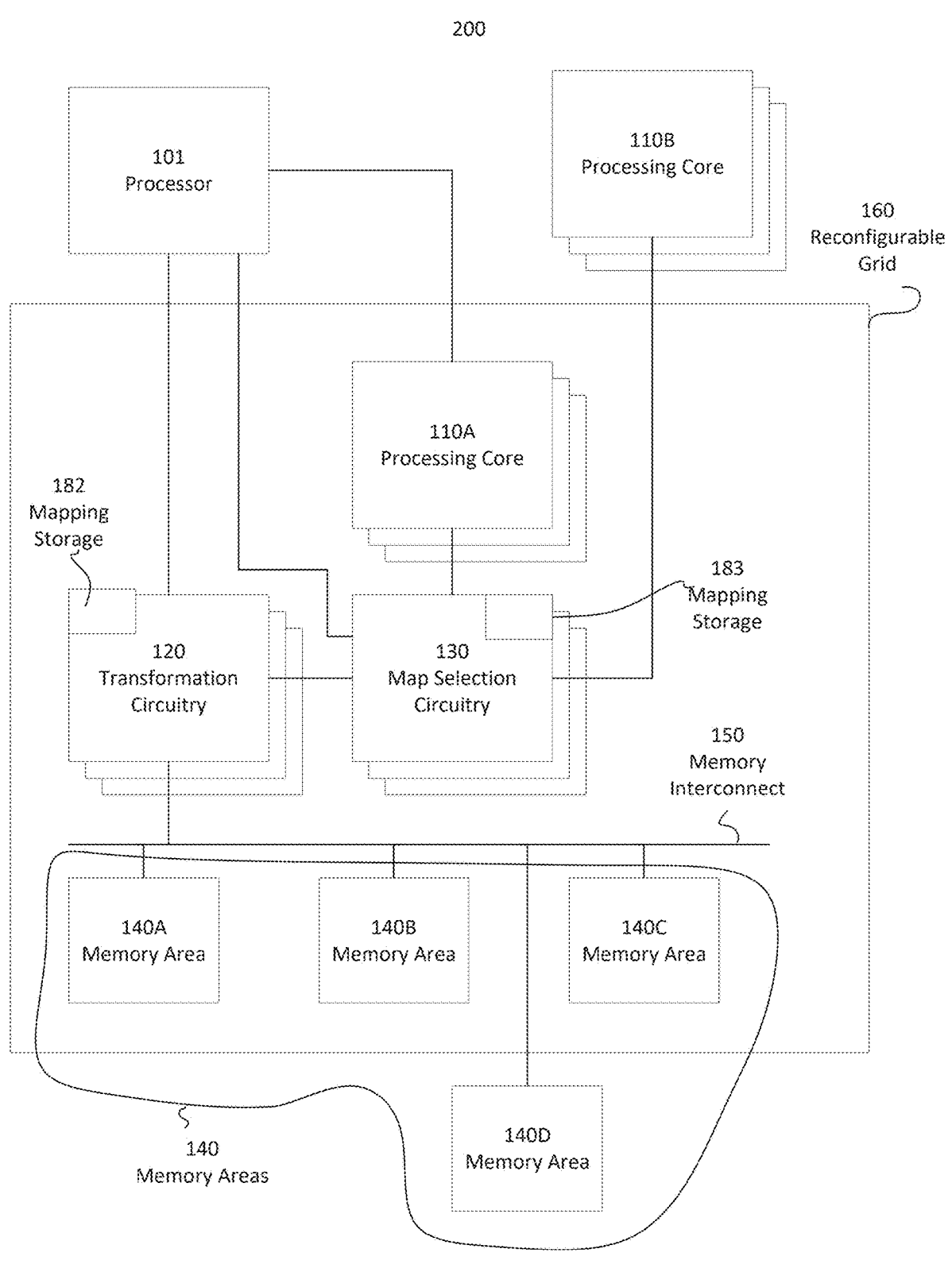
FIG. 2 is a schematic block diagram of another exemplary system, according to some embodiments.

In some embodiments, at least some components are implemented in a reconfigurable processing grid. Reference is now made also to FIG. 2, showing a schematic block diagram of another exemplary system 200, according to some embodiments. In such embodiments, reconfigurable processing grid 160 comprises a plurality of configurable logical elements connected by a plurality of configurable data routing junctions. An example of a reconfigurable logical element is processing circuitry that may be configured to perform one of an identified set of mathematical and logical operations. Some examples of a mathematical operation are addition, subtraction, multiplication and division. Some examples of a logical operation are a logical NOT operation, a logical exclusive-or (XOR) operation, a bitwise XOR operation and a logical AND operation. Optionally, the plurality of processing cores 110 comprises a first subset of processing cores 110A that are implemented in the reconfigurable processing grid 160. Optionally, the plurality of processing cores 110 comprises a second subset of processing cores 110B that are external to the reconfigurable processing grid 160 and connected thereto. Optionally, at least some of the plurality of memory areas 140 are implemented in the reconfigurable processing grid 160, for example memory area 140A, memory area 140B and memory area 140C. Optionally at least some other of the plurality of memory areas 140, for example memory area 140D, are external to the reconfigurable processing grid 160 and connected thereto.

Optionally, system 100 and additionally or alternatively system 200 comprises a plurality of memory storage entities. Optionally, each of the plurality of memory areas 140 is associated with one or more storage entities of the plurality of memory storage entities. A memory storage entity may be a cache or a cache bin. A memory storage entity is optionally a random access memory, for a DRAM and a SDRAM. Another example of a memory storage entity is a scratchpad, for example a SRAM. Other examples of a memory storage entity include, but are not limited to, a HBM bank. Optionally, at least part of a memory area, for example memory area 140A, is stored in one or more memory storage entities of the plurality of memory storage entities and the memory area 140A is associated with the one or more memory storage entities. Optionally, the plurality of memory areas 140 is organized in a grid by organizing the plurality of memory storage entities in a grid.

Optionally, system 100 and additionally or alternatively system 200 comprises a plurality of memory access entities that control access to the plurality of memory areas 140. Optionally, each of the plurality of memory areas 140 is associated with one or more access entities of the plurality of memory storage entities. Some examples of a memory access entity include, but are not limited to, a HBM controller, a DDR controller and a DRAM controller providing access to a memory component. Optionally, a memory area, for example memory area 140D, is associated with one or more memory access entities of the plurality of memory access entities that control access to memory area 140D. Optionally, the plurality of memory areas 140 is organized in a grid by organizing the plurality of memory access entities in a grid.

Optionally, the plurality of processing cores 110 execute one or more software applications. Optionally, the one or more processing cores execute one of the one or more software applications. Optionally, the software applications issue a plurality of memory access requests. Optionally, the one or more software applications issue another plurality of memory access request that comprises the plurality of memory access requests issued by the software application executed by the one or more processing cores.

Optionally, system 100 and additionally or alternatively system 200 comprise one or more page tables. Optionally, the one or more page tables are associated with the one or more processing cores executing the application. Optionally, the one or more page tables comprise a plurality of PTEs. Optionally, application memory of the software application is organized in a plurality of application memory pages. Optionally, each application memory page of the plurality of application memory pages maps to one or more of the plurality of memory areas 140 via one or more PTEs of the plurality of PTEs.

Optionally, system 100 and additionally or alternatively system 200 comprise a telemetry collector, configured to collect a plurality of memory access statistical values, optionally while the plurality of processing cores 110 execute the one or more software applications. The telemetry collector may be a hardware component, a software component executed by processing unit 101 or a combination. Optionally, system 100 and additionally or alternatively system 200 comprise a memory manager, configured to analyze the plurality of memory access statistical values, optionally while the plurality of processing cores 110 execute the one or more software applications. The memory manager may be another hardware component, another software component executed by processing unit 101 or a combination.

To control distribution of the plurality of memory access requests and additionally or alternatively the other plurality or memory access requests among the plurality of memory areas 140, in some embodiments system 100 or system 200 implement the following optional method.

Figure 3:
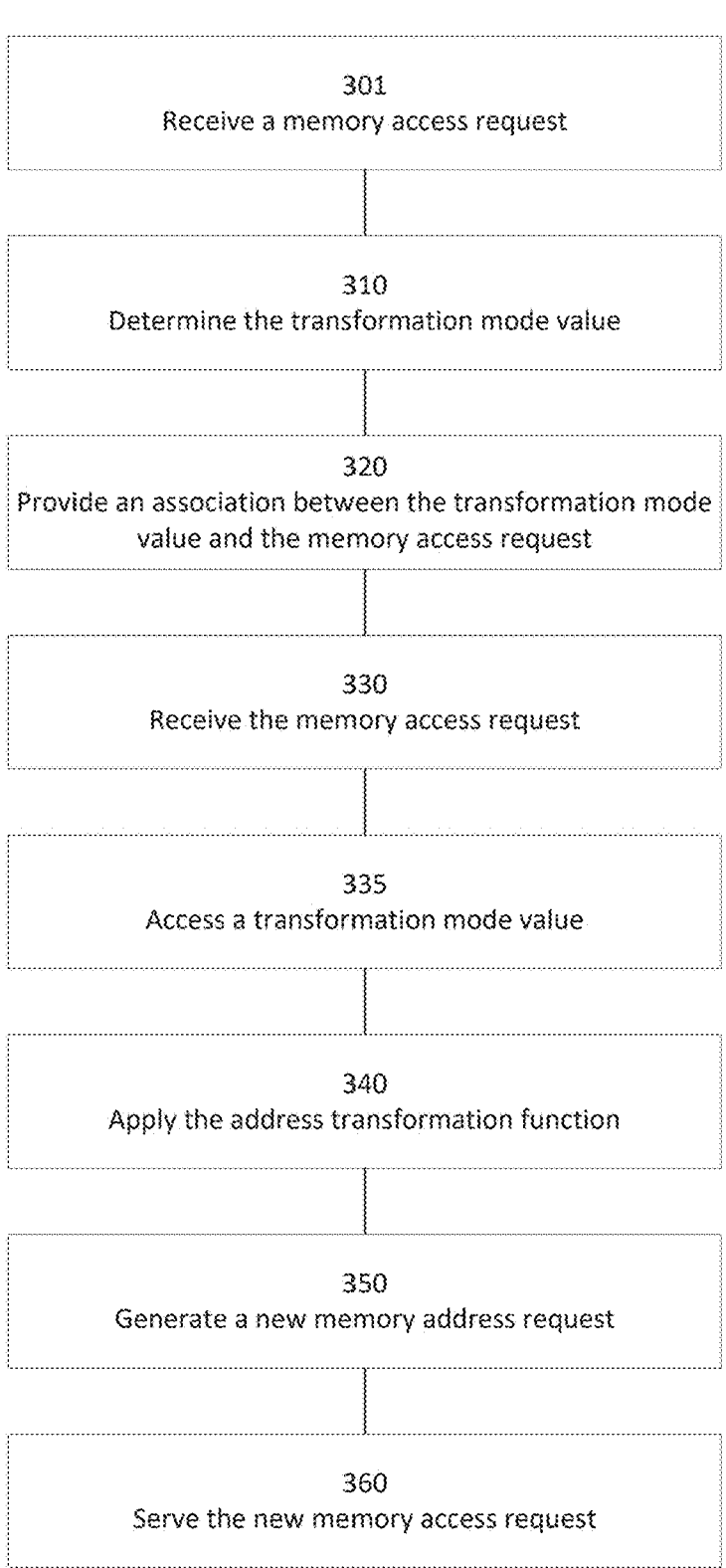
FIG. 3 is a flowchart schematically representing an optional flow of operations, according to some embodiments.

Reference is now made also to FIG. 3, showing a flowchart schematically representing an optional flow of operations 300, according to some embodiments. In such embodiments, in 301 map selection circuitry 130 receives a memory access request, optionally from one of the plurality of processing cores 110. Optionally the memory access request is issued by a software application of the one or more software applications executed by the plurality of processing cores 110. In 310, map selection circuitry 130 optionally determines a transformation mode value based on the memory access request. Optionally, the transformation mode value is indicative of an address transformation function to apply to a memory address of the memory access request.

Reference is now made also to FIG. 4, showing a flowchart schematically representing an optional flow of operations 400 for determining a transformation mode value, according to some embodiments. Optionally, in 410 map selection circuitry 130 computes one or more additional memory access parameters according to the memory access request. In 420, map selection circuitry 130 optionally accesses mapping storage 183 according to the one or more additional memory access parameters, optionally in order to access the transformation mode value. Optionally, map selection circuitry 130 retrieves from mapping storage 183 a mapping of the one or more mappings stored in mapping storage 183 that maps between the one or more additional memory access parameters and the transformation mode value.

Reference is now made again to FIG. 3. In 320, map selection circuitry 130 provides an association between the transformation mode value and the memory access request to transformation circuitry 120. For example, map selection circuitry may insert the transformation mode value into the memory access request, optionally providing by this an association between the memory access request and the transformation mode value. Optionally, map selection circuitry 130 inserts the transformation mode value into the memory address of the memory access request.

In 330, transformation circuitry 120 optionally receives the memory access request. In 335, transformation circuitry 120 optionally access a transformation mode value associated with the memory access request. When map selection circuitry 130 inserts the transformation mode value into the memory access request, transformation circuitry 120 optionally extracts the transformation mode value from the memory access request. Optionally, transformation circuitry 120 receives the memory access request from the one processing core of the plurality of processing cores. When map selection circuitry 130 does not insert the transformation mode value into the memory access request, transformation circuitry 120 may access the transformation mode value from other mapping storage 182. Optionally, transformation circuitry 120 executes method 400 to access the transformation mode value, using other mapping storage 182 instead of mapping storage 183, with transformation circuitry 120 executing the steps of method 400 instead of map selection circuitry 183.

In 340, transformation circuitry 120 optionally applies the address transformation function to the memory address in the memory access request. Optionally, the address transformation function comprises a bit transposition operation applied to at least part of the memory address.

Figure 5:
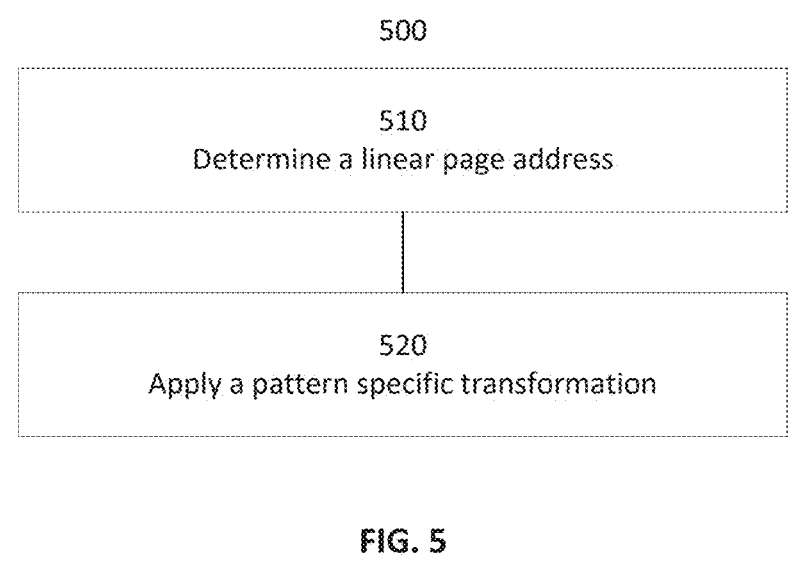

Reference is now made also to FIG. 5, showing a flowchart schematically representing an optional flow of operations 500 for applying an address transformation function, according to some embodiments.

In the context of memory distribution functions, when application memory is organized in a plurality of memory pages, a linear page address represents an "origin" or base location of a memory page in a conceptual linear memory space. Optionally, the linear page address determines where in the physical memory the page would be located if no distribution transformation were applied—essentially a one-to-one mapping to a contiguous block of physical memory. Thus, where an application memory address may be used by more than one application and where in each application the application memory address references a different physical memory area, a linear page address represents a unique sequential range of memory (unique page) before any distribution transformation is applied. Optionally, the linear page address represents a unique sequential range of physical memory (physical page).

Optionally, in 510 transformation circuitry 120 determines a linear page address for the memory address. When applying a distribution transformation function, the linear page address performs at least one of two functions. First, the linear page address establishes the starting point or "origin" for the distribution pattern in the physical memory space. For example, with a rectangular distribution pattern in memory organized in a grid, the linear page address determines the corner position of the rectangle in the memory grid. Second, the linear page address separates the addressing into two domains: a page-level addressing (bits above page-internal bits in the memory address) which determine the linear page address, and a page-internal addressing (bits within the page) which are subject to the distribution transformation. Optionally, when the memory address is a virtual address, the transformation circuitry determines the linear page address by replacing higher-order bits of the virtual address.

In 520, transformation circuitry 120 optionally applies a pattern-specific transformation to address bits within a page of memory. Optionally, transformation circuitry 120 applies the pattern-specific transformation according to the transformation mode value. Optionally, the pattern-specific transformation distributes the unique sequential range of memory address represented by the linear page address according to the distribution pattern of the address transformation function indicated by the transformation mode value. Optionally, the pattern-specific transformation distributes a plurality of memory accesses within a page of memory among at least some of the plurality of memory areas 140. Optionally, when the linear page address represents a unique sequential range of physical memory, the pattern-specific transformation distributes the plurality of memory accesses within the physical page among at least some of the plurality of memory areas 140. Optionally, the pattern-specific transformation comprises the bit transposition operation.

Reference is now made again to FIG. 3. In 350, transformation circuitry 120 optionally generates a new memory access request using the memory access request and the transformed memory address computed in 340. Optionally, to generate the new memory access request transformation circuitry 120 replaces the memory address in the memory access request with the transformed memory address.

Optionally, at least one memory area of the plurality of memory areas 140, for example memory area 140A and memory area 140B, are configured to serve the new memory access request according to the transformed memory address. In 360, memory area 140A and memory area 140B serve the new memory access request according to the transformed memory address.

Optionally, at least one hardware processor 101 is configured to configure one or more components of system 100 or system 200.

To configure one or more components of system 100 or system 200, in some embodiments processing unit 101 executes the following optional method.

Figure 6:
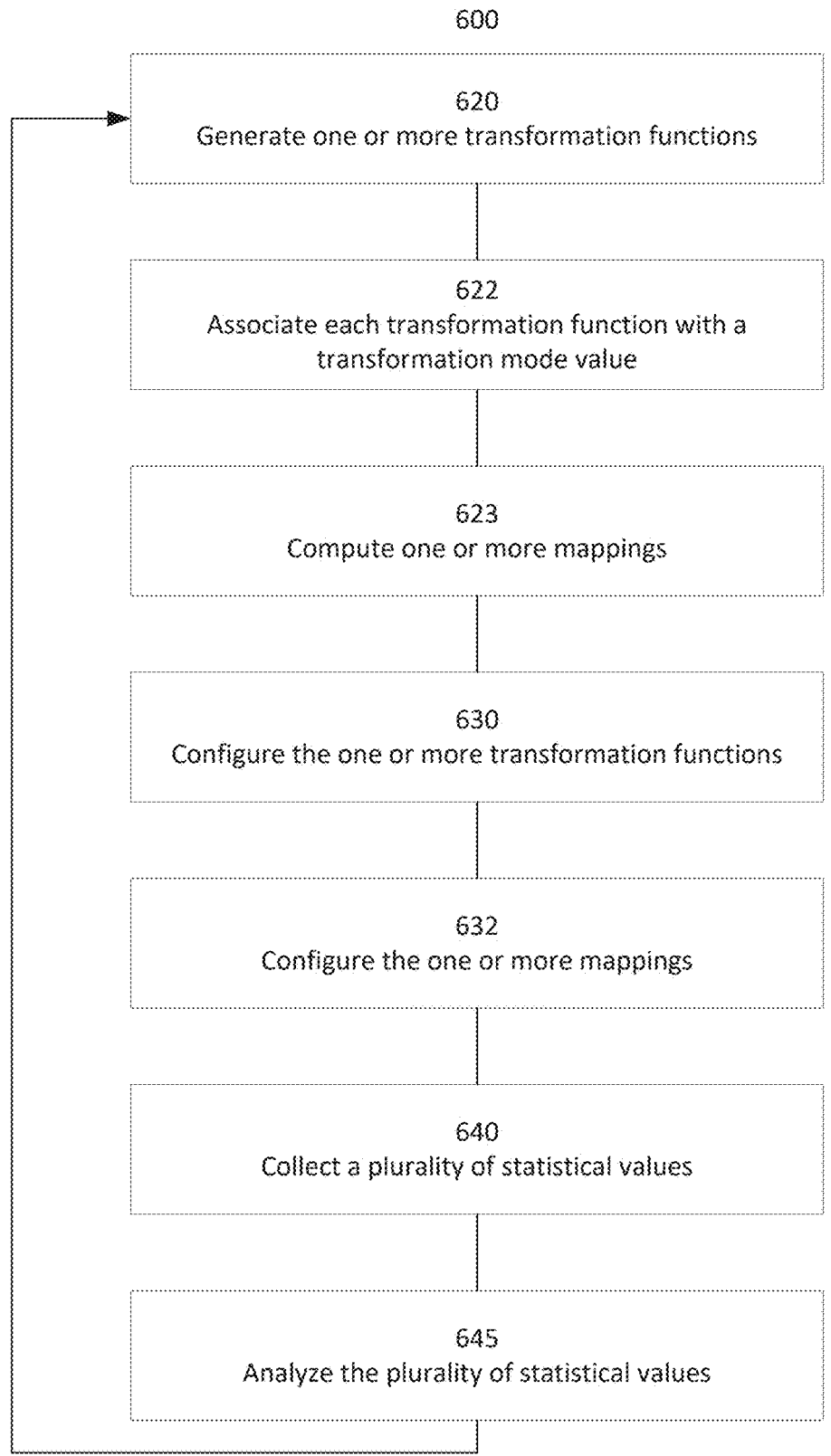
FIG. 6 is a flowchart schematically representing an optional flow of operations for configuring, according to some embodiments.

Reference is now made also to FIG. 6, showing a flowchart schematically representing an optional flow of operations 600 for configuring, according to some embodiments. In such embodiments, in 622 processing unit 101 associates each of a set of transformation functions with a transformation mode value indicative thereof. In 623, processing unit 101 optionally computes one or more mappings, each mapping between one or more memory access parameters and a transformation mode value. Optionally, the one or more memory access parameters represent at least some of the plurality of other memory access requests issued by the one or more applications, such that the mapping comprising the one or more memory access parameters associates the at least some of the plurality of other memory access requests represented thereby with the transformation mode value associated in the mapping, and thus associates said at least some of the plurality of other memory access requests with a transformation function associated with the transformation mode value.

In 630, processing unit 101 optionally configures the transformation circuitry 120 to perform at least some of the set of transformation functions.

Optionally, in 632 processing unit 101 configures the at least some transformation functions in the map selection circuitry 130. and additionally or alternatively in the transformation circuitry 120.

Optionally, configuring a transformation function comprises configuring at least one mapping computed in 623 in mapping storage 183 of map selection circuitry 130, and additionally or alternatively in other mapping storage 182 of transformation circuitry 120, where the at least one mapping comprise the respective transformation mode value indicative of the transformation function.

To apply a common transformation function to memory access requests of the processing core associated with the map selection circuitry 130 and the transformation circuitry 120, processing unit 101 optionally configures the map selection circuitry 130, and additionally or alternatively the transformation circuitry 120 to use an identified transformation value as the transformation mode value used to generate the new memory access request for each of the plurality of memory access requests issued by the application executed by the processing core. Optionally, the transformation function indicated by the identified transformation value is one of the set of transformation functions.

When system 100 or system 200 comprise one or more page tables, processing unit 101 may configure the address translation function in the PTE, for example to configure different transformation functions for different pages of the software application. Optionally, for each application memory page of the plurality of application memory pages of the software application, processing unit 101 stores in the one or more respective PTEs mapping the application memory page a page-specific transformation mode value. Optionally, the page specific transformation value is indicative of one of the set of transformation functions. Optionally, processing unit 101 configures the map selection circuitry 130 to use the page-specific transformation value of a PTE of the plurality of PTEs as the transformation mode value when the memory address in the memory access request is in the one or more application memory pages mapped by the PTE.

Optionally, processing unit 101 stores the page-specific transformation mode value using one or more binary bits in the PTE, where the one or more binary bits encode one of the set of address functions. When processing unit 101 uses an identified number of bits in the PTE, the number of different transformation functions that can be encode is up to two to the power of the identified number bits. When a processing core executes at most one application and two or more of the processing cores are each associated with different page tables of the one or more page tables, processing unit 101 may encode in one page table a first subset of the set of transformation function and in another page table a second subset of the set of transformation functions, where the first subset is different from the subset, thus creating different mapping schemes for each of the applications executed by the two or more processing cores.

When the application is executed by more than one processing core, processing unit 101 optionally configures the same transformation functions, and additionally or alternatively the same transformation mode values, on all the more than one processing cores.

Optionally, processing unit 101 collects in 640 a plurality of memory access statistical values, optionally when the plurality of processing cores 110 executes the one or more software applications. A memory access statistical value may be related to an application memory page, for example a count of accesses to the application memory page and a pattern of memory accesses to the application memory page. Optionally, a memory access statistical value is related to a range of memory addresses, for example a count of accesses to a range of memory addresses of the plurality of memory areas from one or more identified memory access instructions, and a round-trip latency of an access to the range of memory addresses of the plurality of memory areas from the one or more identified memory access instructions. Some other examples of a memory access statistical value are related to caching, for example a cache-hit rate of the range of memory addresses of the plurality of memory areas from the one or more identified memory access instructions, and a cache-miss rate of the range of memory addresses of the plurality of memory areas from the one or more identified memory access instructions. Some other examples of a memory access statistical value include, but are not limited to, an identification of a processing core accessing the application memory page, and a count of accesses of an identified access type, for example according to an opcode in a memory access request such as a read access, a write access or an atomic access. A memory access statistical value can be per an application memory page. Optionally a memory access statistical value is global. Optionally, a memory access statistical value is according to a virtual address. Optionally, a memory access statistical value is according to a physical address. Optionally, the plurality of memory access statistical values is collected by the telemetry collector.

In 645, processing unit 101 optionally analyzes the plurality of memory access statistical values. Optionally, the plurality of memory access statistical values is analyzed by the memory manager. Optionally, processing unit 101 reconfigures one or more of the components according to the plurality of memory access statistical values. For example, in 620, processing unit 101 may generate one or more new transformation functions. Optionally, processing unit 101 repeats one or more step of method 600 according to the plurality of memory access statistical values, for example, computes in 623 one or more new mappings. Optionally, the one or more new transformation functions are generated based on one or more memory access metrics of an application memory page. Optionally, the memory manager is configured to select the address transformation function for each application memory paged based on the collected plurality of memory access statistical values.

Some examples of a memory access metric include, but are not limited to, a bandwidth requirement of the application memory page and a latency requirement of the application memory page. A latency requirement could lead to a locality requirement, for example distributing the page among one or more caches that are local to the processing core executing the software program. Some other examples include a balance requirement of a port accessing the application memory page, for example a balance between a number of requests addressed to the port and a number of responders servicing the requests addressed to the port. When the application memory page is mapped to one or more of the plurality of memory areas, a memory access metric may be a balance requirement between accesses to the one or more memory areas to which the application memory page is mapped. Optionally, a memory access metric is a measure of network congestion between the plurality of processing cores 110 and the plurality of memory areas 140, for example a measure of congestion in memory interconnect 150. Optionally, analyzing the plurality of memory access statistical values is used to identify compliance, or lack thereof, of the plurality of memory access requests to at least one of the one or more memory access metrics.

Additionally or alternatively, processing unit 101 may execute 630 again to configure the one or more new transformation functions in the transformation circuitry 120, and additionally or alternatively execute 632 again to configure the one or more new mappings. Optionally, the memory manager is further configured to modify the address transformation function dynamically, during execution of the software application. Optionally, the memory manager modifies the address transformation function dynamically in response to changes in the plurality of memory access statistical values.

The following descriptions focus on a plurality of memory storage entities that are a plurality of cache bins, however the same considerations apply to other types of memory storage entities, as well as to a plurality of memory access entities.

For example, when the analysis indicates that an amount of cache misses when accessing a particular application memory page in a given time interval exceeds an identified cache miss threshold, the memory manager may modify the address transformation function associated with the particular application memory page to increase a number of cache bins used to cache the particular application memory page.

Optionally, to modify the address transformation function associated with the particular application memory page processing unit 101, and additionally or alternatively the memory manager, modify the page-specific transformation mode value associated with the particular application memory page, for example in a mapping storage or in one or more PTEs, where the modified page-specific transformation mode value is indicative of a new address transformation function. Optionally, when modifying the page-specific transformation mode value, processing unit 101, and additionally or alternatively the memory manager copy data from particular application memory page according to the new address transformation function.

Optionally, before modifying the page specific transformation mode value processing unit 101, and additionally or alternatively the memory manager, pause access to the particular application memory page and resume the access after modifying the page specific transformation mode value. Optionally, before modifying the page-specific transformation mode value processing unit 101, and additionally or alternatively the memory manager, pause execution of the software application and resume the execution after modifying the page specific transformation mode value. Optionally, processing unit 101, and additionally or alternatively the memory manager, modify the page specific transformation mode value while the application executes and accesses the particular application memory page.

In another example, when the analysis indicates that an amount of cache accesses to a given cache bin in a given time interval when executing the one or more applications exceeds an identified cache access threshold, the memory manager may modify one or more address transformation functions associated with one or more application memory pages cached in the given cache bin such that the one or more application memory pages are cached in more than one cache bin.

In yet another example, when the analysis indicates that one or more cache bins for caching one or more application memory pages are accessed by one or more processing cores that are topologically close to each other on the memory interconnect, the memory manager may modify the address transformation function associated with the one or more application memory pages to cache the one or more application memory pages in one or more cache bins that are topologically close to the one or more processing cores, to reduce traveling time of a group of memory access requests addressed to the one or more application memory pages.

Figure 7:
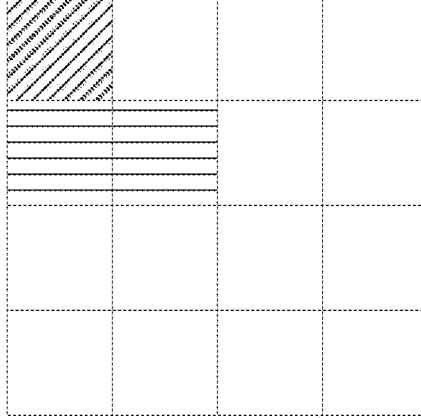
FIG. 7 is a schematic block diagram of an exemplary set of distribution patterns, according to some embodiments.
Figure 7:
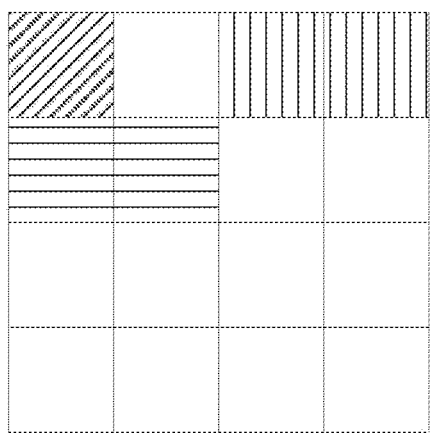
Figure 7:
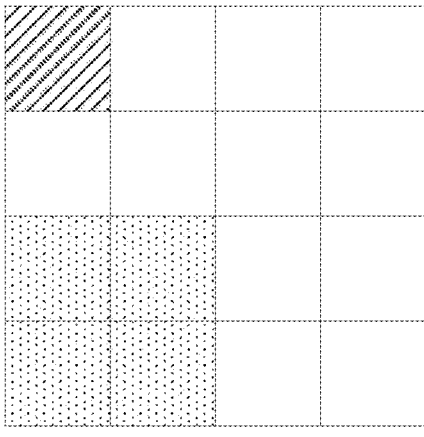
Figure 7:
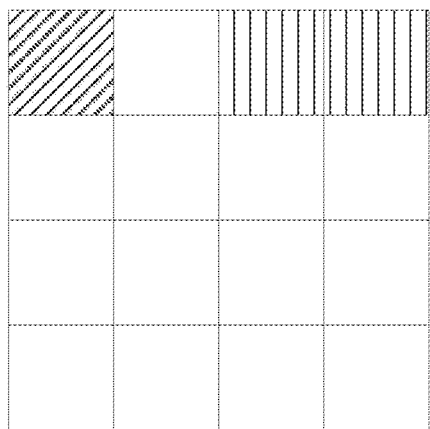
Figure 7:
Figure 7:
Figure 7:
Figure 7:

To better understand the effects of a distribution function, reference is now made also to FIG. 7, showing a schematic block diagram of an exemplary set of distribution patterns 700, according to some embodiments. In this example, four application memory pages—page 1, page 2, page 3 and page 4 are mapped to four memory areas—memory area 140A, memory area 140B, memory area 140C and memory area 140D. In this example page 1 is identified by a dotted pattern, page 2 is identified by a vertical lines pattern, page 3 is identified by a horizontal lines pattern and page 4 is identified by a diagonal lines pattern.

In this example the four memory areas are organized in a grid having two rows and two columns.

It can be seen in the example that the relative location of a segment of a page in a memory area is the same in all memory areas to which the page is mapped.

In this example, page 1 is distributed by a first mapping function such that entire page 1 is mapped to a single memory area 140C, all in a bottom left corner of memory area 140C.

Further in this example, page 2 is distributed by a second mapping function in a vertical rectangle having two rows and one column consisting of memory area 140A and memory area 140C. In each of memory area 140A and memory area 140C, segments of page 2 are located in a top right corner of the memory area.

Further in this example, page 3 is distributed by a third mapping function in a horizontal rectangle having one row and two columns consisting of memory are 140A and memory area 140B. In each of memory area 140A and memory area 140B, segments of page 3 are located in the left side of the memory area, at an equal distance from the top.

Further in this example, page 4 is distributed by a fourth mapping function in a rectangle having two rows and two columns consisting of all four memory areas. In each of memory area 140A, memory area 140B, memory area 140C and memory area 140*d*, segments of page 4 are located in a top left corner of the memory area.

Optionally, processing unit 101 computes the one or more mappings that map between one or more memory access parameters and a transformation mode value (for example in 623) such that there is no overlap between any of pages 1-4 in any of the plurality of memory areas 140A-140D. Optionally, processing unit 101 is configured to prohibit overlapping of two or more application memory pages in a memory area. Prohibiting such overlapping increases data integrity, preventing accesses to one page from corrupting data of another page.

However, there may be cases where there is no risk of data corruption between application data pages, for example when each application data page of the two or more application memory pages mapped to a part of a memory area uses only part of said part of the memory area allocated thereto according to the transformation function. In such cases overlapping the pages allows for better utilization of the memory area. Optionally, processing unit 101 is configured to allow overlapping of two or more application memory pages in a memory area.

Figure 8:
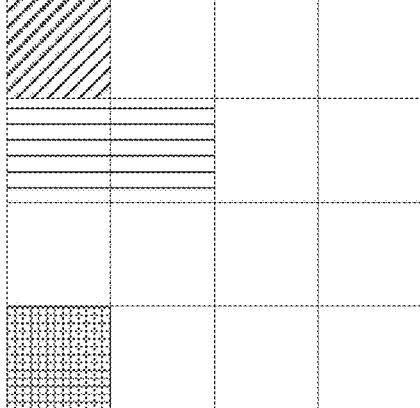
FIG. 8 is a schematic block diagram of another exemplary set of distribution patterns, according to some embodiments.
Figure 8:
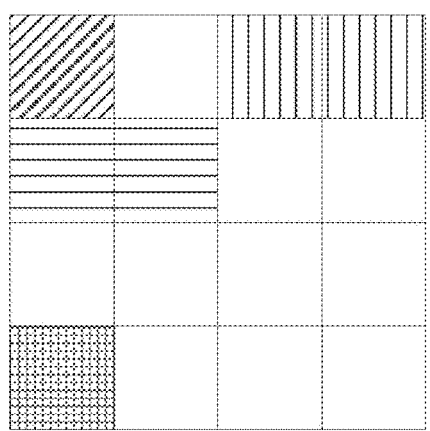
Figure 8:
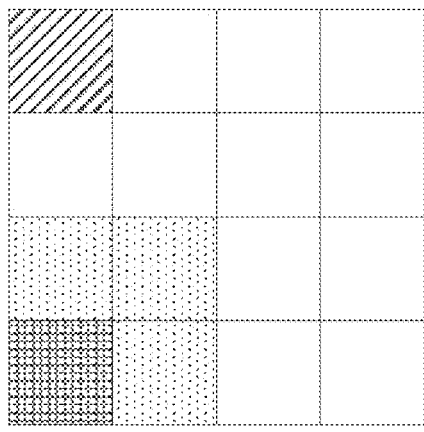
Figure 8:
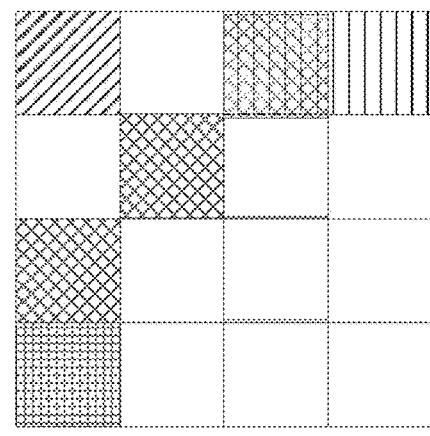
Figure 8:
Figure 8:
Figure 8:
Figure 8:
Figure 8:
Figure 8:

Reference is now made also to FIG. 8, showing a schematic block diagram of another exemplary set of distribution patterns 800, according to some embodiments, extending the exemplary set of distribution patterns 700. In this example, two additional application memory pages—page 5 and page 6 are mapped to the four memory areas 140A-140D.

In this example page 5 is identified by a grid pattern formed by vertical and horizontal lines, and page 6 is identified by a diagonal crosshatch pattern formed by intersecting lines at oblique angles.

In this example, page 5 is distributed by a fifth mapping function in another rectangle having two rows and two columns consisting of all four memory areas. In each of memory area 140A, memory area 140B, memory area 140C and memory area 140*d*, segments of page 4 are located in a bottom left corner of the memory area, such that in memory area 140C the bottom left corner is assigned to both page 1 and page 5.

Further in this example, page 6 is distributed by a sixth mapping function such that entire page 6 is mapped to a single memory area 140D, all in a diagonal of memory area 140D, such that a segment at the top of memory area 140D is assigned to both page 2 and page 6.

In a grid of memory areas interconnected through a network fabric, memory access requests must traverse routing paths between processing cores and their target memory areas. When multiple requests attempt to use the same network paths simultaneously, network congestion occurs, increasing latency and reducing overall system performance.

Network congestion typically manifests in specific segments of the interconnection network. For example, when multiple processing cores access memory areas distributed horizontally, their access requests may all traverse the same horizontal network links, creating bottlenecks in those links while vertical links remain underutilized. In this case, by changing from a horizontal to a vertical distribution pattern, the system redirects memory access traffic from congested horizontal paths to underutilized vertical paths. Optionally, if telemetry indicates high congestion on horizontal network segments (for example, evidenced by increased round-trip latencies or queuing delays), the memory manager can modify the transformation mode value for affected pages to redistribute them vertically. This redistribution causes subsequent memory accesses to use vertical network paths instead of the congested horizontal ones.

For example, if a page initially distributed in a 1×4 horizontal pattern experiences access delays due to horizontal network congestion, redistributing it in a 4×1 vertical pattern causes the same memory accesses to traverse vertical links instead. Since the vertical links are not experiencing the same congestion, access latency improves, and the load becomes more balanced across the entire network fabric.

The description and examples in the present disclosure focus on rectangular distribution patterns, and more particularly rectangular distribution patterns on memory areas organized in a two-dimensional grid, however it should be noted that the system and methods described herewithin may be applied with other distribution patterns, and with memory areas organized in other patterns. For example, the memory areas may be organized in a pattern having more than two dimensions. Similarly, a distribution pattern may have more than one dimension. In addition, a number of memory areas in one slice of a multiple-dimension pattern, for example one row of a two-dimensional pattern, may be different from another number of memory areas in another slice of the multiple-dimension pattern, for example another row of the two-dimensional pattern. In another example, as shown in FIG. 8 above, a distribution pattern may be diagonal in one or more memory areas.

Figure 9:
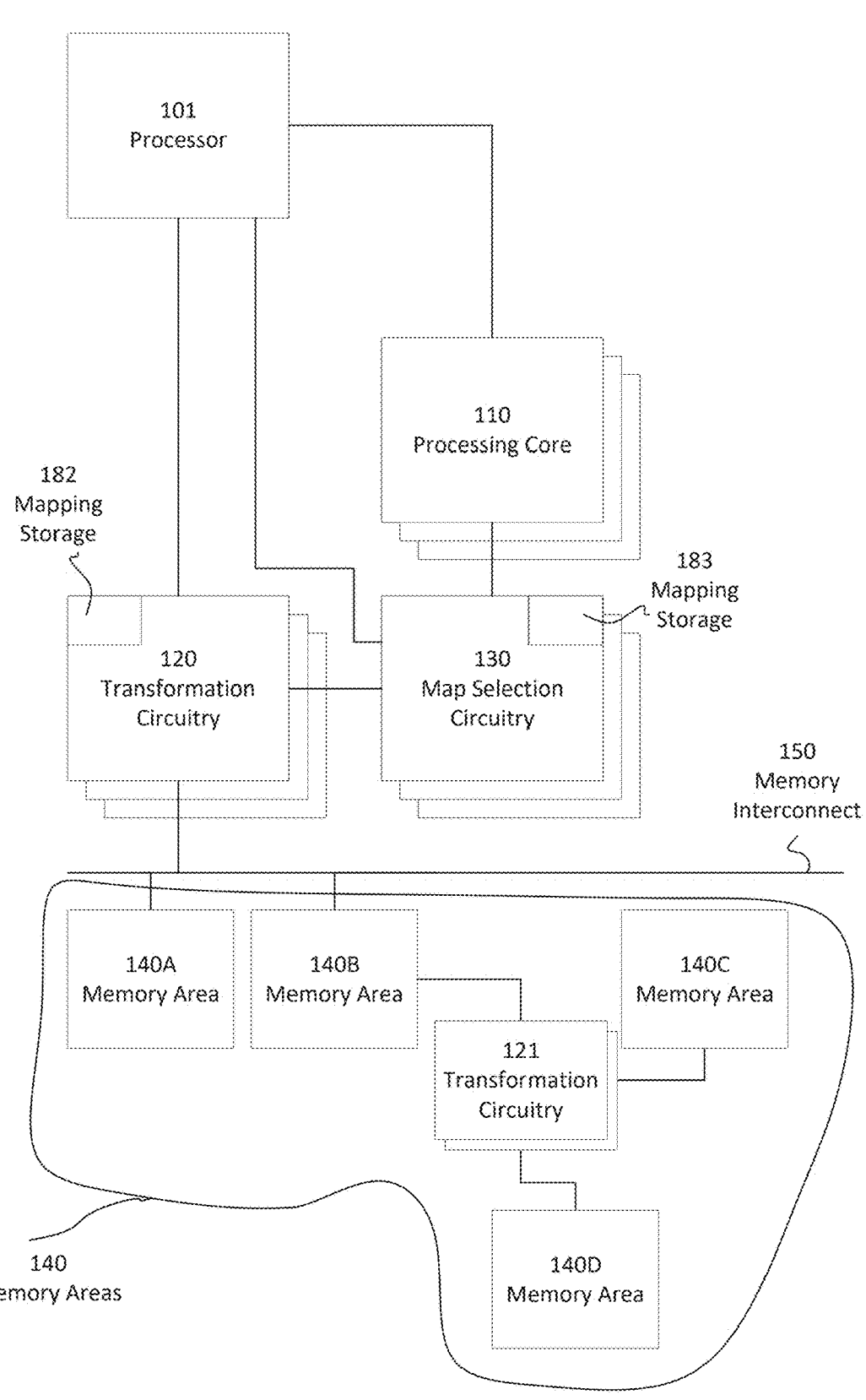
FIG. 9 is a schematic block diagram of yet another exemplary system, according to some embodiments.

According to some embodiments, more than one address transformation function may be applied to a memory address. Reference is now made also to FIG. 9, showing a block diagram of yet another system 900, according to some embodiments.

In this example, at least some of the plurality of memory areas 140, for example memory area 140A and memory area 140B, are a plurality of memory access entities. Optionally, at least some other of the plurality of memory areas 140, for example memory area 140C and memory area 140D, are a plurality of memory storage entities. Optionally, memory access entity 140B provides access to memory area 140C and memory area 140D. Optionally, system 900 comprises one or more additional transformation circuitries 121, connected to memory access entity 140B. Optionally, transformation circuitry 120 applies a first address transformation function distributing the plurality of memory access request between memory access entity 140A and memory access entity 140B. Optionally, one or more additional transformation circuitries 121 apply a second address transformation function distributing a subset of the plurality of memory access requests directed to memory access entity 140B between memory storage entity 140C and memory storage entity 140D. Optionally, for example when the plurality of memory areas 140 is organized in a multi-level access cascade having a plurality of levels, at each level of one or more of the plurality of levels a level-specific address transformation function is applied to a memory access request to distribute a set of memory access requests of the plurality of memory access requests among one or more memory areas of the level. One example is a multi-level cache, where a transformation function is applied at two or more of the levels of the multi-level cache. Another example is a hierarchical HBM, organized in a plurality of channels, each channel providing access to a plurality of memory storage entities.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant address transformation functions will be developed and the scope of the term "address transformation function" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for accessing memory, comprising:
   transformation circuitry configured to:
   receive a memory access request;
   access a transformation mode value associated with the memory access request and indicative of an address transformation function of a plurality of address transformation functions, using different address transformation functions for different memory access requests;

apply the address transformation function, indicated by the transformation mode value, to a memory address of the memory access request to compute a transformed memory address; and generate a new memory access request using the memory access request and the transformed memory address; and at least one memory area configured to serve the new memory access request according to the transformed memory address.

2. The system of claim 1, wherein generating the new memory access request comprises replacing the memory address with the transformed memory address in the memory access request.

3. The system of claim 1, further comprising map selection circuitry configured to:

determine the transformation mode value based on the memory access request; and provide the transformation circuitry with an association between the transformation mode value and the memory access request.

4. The system of claim 3, wherein the map selection circuitry is further configured to insert the transformation mode value into the memory access request;

wherein the map selection circuitry provides the association between the transformation mode value and the memory access request by inserting the transformation mode value into the memory access request; and wherein the transformation circuitry accesses the transformation mode value by extracting the transformation mode value from the memory access request.

5. The system of claim 3, wherein the system further comprises:

a plurality of processing cores connected to a plurality of memory areas, wherein the at least one memory area is a member of the plurality of memory areas; and at least one hardware processor;

wherein the map selection circuitry further comprises a mapping storage for storing at least one association between one or more memory access parameters and another transformation mode value;

wherein the map selection circuitry and the transformation circuitry are associated with at least one processing core of the plurality of processing cores;

wherein the map selection circuitry determining the transformation mode value based on the memory access request comprises:

computing at least one additional memory access parameter according to the memory access request; and accessing the transformation mode value in the mapping storage according to the at least one additional memory access parameter, and wherein the at least one hardware processor is configured to:

configure the at least one association in the mapping storage of the map selection circuitry; and configure the address transformation function in the map selection circuitry.

6. The system of claim 5, wherein the at least one processing core is configured to execute a software application;

wherein executing the software application comprises issuing a plurality of memory access requests; and wherein configuring the address transformation function comprises configuring the map selection circuitry to use for each of the plurality of memory access requests an identified transformation mode value as the transformation mode value used to generate the new memory access request therefor.

7. The system of claim 5, further comprising at least one page table associated with the at least one processing core, the at least one page table comprising a plurality of page table entries (PTEs);

wherein the at least one processing core is configured to execute a software application;

wherein application memory of the software application is organized in a plurality of application memory pages, each of the plurality of application memory pages mapped to at least one of the plurality of memory areas via at least one PTE of the plurality of PTEs;

wherein executing the software application comprises issuing a plurality of memory access requests to the plurality of application memory pages; and wherein configuring the address transformation function comprises:

for each application memory page of the plurality of application memory pages, storing in the at least one FTE mapping the application memory page a page-specific transformation mode value indicative of one of the plurality of address transformation functions; and configuring the map selection circuitry to use the page-specific transformation mode value of a PTE of the plurality of PTEs as the transformation mode value when the memory address is in the at least one application memory page mapped by the PTE.

8. The system of claim 7, wherein the address transformation function indicated by the page-specific transformation mode value is selected based on at least one memory access metric of the application memory page.

9. The system of claim 5, wherein configuring the address transformation function in the map selection circuitry comprises adding to the mapping storage an association between at least one memory access parameter and the transformation mode value, where the at least one memory access parameter is computed using the memory access request.

10. The system of claim 5, wherein the at least one processing core is configured to execute a software application;

wherein application memory of the software application is organized in a plurality of application memory pages; and wherein each of the plurality of address transformation functions defines a distribution pattern of an application memory page of the plurality of application memory pages across the plurality of memory areas.

11. The system of claim 10, wherein each memory area of the plurality of memory areas is associated with one or more memory storage entities of a plurality of memory storage entities, the one or more memory storage entities storing at least part of the memory area, wherein the plurality of memory storage entities is one of: a plurality of cache bins or a plurality of random access memory banks; and wherein the distribution pattern of the application memory page across the plurality of memory areas corresponds to a pattern of distribution of a plurality of application memory addresses of the application memory page across the plurality of memory storage entities.

12. The system of claim 10, wherein each memory area of the plurality of memory areas is associated with one or more memory access entities of a plurality of memory access entities, the one or more memory access entities controlling access to the memory area, wherein the plurality of memory access entities is one of: a plurality of HBM controllers, a plurality of cache controllers, or a plurality of double data rate (DDR) controllers; and wherein the distribution pattern of the application memory page across the plurality of memory areas corresponds to another pattern of distribution of a plurality of application memory addresses of the application memory page across the plurality of memory access entities.

13. The system of claim 5, wherein the at least one processing core is configured to execute a software application;

wherein application memory of the software application is organized in a plurality of application memory pages; and wherein configuring the address transformation function further comprises:

collecting a plurality of memory access statistical values during execution of the software application; and configuring the address transformation function based on the plurality of memory access statistical values.

14. The system of claim 13, further comprising:

a telemetry collector configured to collect the plurality of memory access statistical values; and a memory manager configured to select the address transformation function for each application memory page based on the collected memory access statistics;

wherein the memory manager is further configured to dynamically modify the address transformation function during execution of the software application responsive to changes in the plurality of memory access statistical values.

15. The system of claim 5, wherein the plurality of processing cores are implemented in a reconfigurable processing grid comprising a plurality of reconfigurable logical elements connected via a plurality of reconfigurable routing junctions; and wherein the reconfigurable processing grid comprises at least some of the plurality of memory areas.

16. The system of claim 1, wherein the transformation circuitry further comprises another mapping storage for storing at least one other association between one or more other memory access parameters and yet another transformation mode value; and wherein the transformation circuitry is further configured to:

compute at least one other additional memory access parameter according to the new memory access request; and access the transformation mode value in the other mapping storage according to the at least one other additional memory access parameter; and wherein the system further comprises at least one other hardware processor configured to configure the at least one other association in the other mapping storage of the transformation circuitry.

17. The system of claim 1, wherein applying the address transformation function comprises:

determining a linear page address for the memory address, where the linear page address represents a unique sequential range of memory addresses before any distribution transformation is applied; and applying a pattern-specific transformation to address bits within a page of memory according to the transformation mode value.

18. The system of claim 1, wherein the address transformation function comprises a bit transposition operation applied to at least part of the memory address.

19. The system of claim 1, wherein the memory access request is to an application memory page; wherein the system further comprises: at least one processing core configured to execute a software application, wherein application memory of the software application is organized in a plurality of application memory pages; map selection circuitry comprising a mapping storage for storing at least one association between one or more memory access parameters and another transformation mode value, indicative of one of the plurality of address transformation functions, the map selection circuitry configured to: receive the memory access request to the application memory page; compute at least one additional memory access parameter according to the memory access request; access a page-specific transformation mode value in the mapping storage according to the at least one additional memory access parameter, wherein the page-specific transformation mode value is associated with the application memory page; and provide an association between the page-specific transformation mode value and the memory access request; and wherein the transformation circuitry is further configured to: access the page-specific transformation mode value provided by the map selection circuitry as the transformation mode associated with the memory access request; and apply the respective address transformation function, indicated by the page-specific transformation mode value, as the address transformation function.

20. A method for accessing memory, comprising:

receiving a memory access request;

accessing a transformation mode value associated with the memory access request and indicative of an address transformation function of a plurality of address transformation functions, using different address transformation functions for different memory access requests;

applying the address transformation function, indicated by the transformation mode value, to a memory address of the memory access request to compute a transformed memory address;

generating a new memory access request using the memory access request and the transformed memory address; and serving the new memory access request by at least one memory area according to the transformed memory address.

21. A software program product for accessing memory, comprising:

a non-transitory computer readable storage medium;

first program instructions for receiving a memory access request;

second program instructions for accessing a transformation mode value associated with the memory access request and indicative of an address transformation function of a plurality of address transformation functions, using different address transformation functions for different memory access requests;

third program instructions for applying the address transformation function, indicated by the transformation mode value, to the memory address of the memory access request to compute a transformed memory address;

fourth program instructions for generating a new memory access request using the memory access request and the transformed memory address; and fifth program instructions for serving the new memory access request by at least one memory area according to the transformed memory address;

wherein the first, second, third, fourth, and fifth program instructions are executed by at least one computerized processor from the non-transitory computer readable storage medium.

\* \* \* \* \*